US010539238B2

(12) United States Patent
Pisasale

(10) Patent No.: US 10,539,238 B2
(45) Date of Patent: Jan. 21, 2020

(54) SEALING ELEMENT FOR A HYDRAULIC FITTING

(71) Applicant: CNH Industrial America LLC, New Holland, PA (US)

(72) Inventor: Davide Pisasale, Chicago, IL (US)

(73) Assignee: CNH Industrial America LLC, New Holland, PA (US)

( * ) Notice: Subject to any disclaimer, the term of this patent is extended or adjusted under 35 U.S.C. 154(b) by 1129 days.

(21) Appl. No.: 14/489,869

(22) Filed: Sep. 18, 2014

(65) Prior Publication Data

US 2016/0084382 A1 Mar. 24, 2016

(51) Int. Cl.
*F16J 15/10* (2006.01)
*F16J 15/02* (2006.01)
(Continued)

(52) U.S. Cl.
CPC ............... *F16J 15/10* (2013.01); *F16J 13/14* (2013.01); *F16J 15/025* (2013.01); *F16J 15/062* (2013.01);
(Continued)

(58) Field of Classification Search
CPC .. F16J 15/10; F16J 13/14; F16J 15/025; F16J 15/08; F16J 15/106; F16L 15/008; F16L 15/04
(Continued)

(56) References Cited

U.S. PATENT DOCUMENTS 2,783,068 A * 2/1957 Bloom et al. ............ F16J 15/32
277/448
3,544,119 A * 12/1970 Glover .................... F16L 47/10
277/619

(Continued)

FOREIGN PATENT DOCUMENTS

DE 20004675 6/2000
DE 102007021175 4/2008
EP 2495483 9/2012

OTHER PUBLICATIONS

European Search Report dated Feb. 5, 2016 for European Patent Application No. 15185696.0 (8 pages).

*Primary Examiner* — Nathan Cumar
(74) *Attorney, Agent, or Firm* — Rickard K. DeMille; Rebecca L. Henkel

(57) ABSTRACT

A sealing element for a fitting part includes a top section. The top section includes a first surface configured to bear against an outer face of an annular groove of the fitting part and a second surface intersecting the first surface at a first angle. The second surface is configured to bear against a bottom face of the annular groove of the fitting part. The sealing element also includes a bottom section. The bottom section includes a third surface intersecting the second surface at a second angle. The third surface is configured to bear against the bottom face of the annular groove. The bottom section also includes a fourth surface intersecting the third surface. Furthermore, the sealing element includes an indentation formed at an intersection between the second (Continued)

surface and the third surface. The indentation provides a transition between a first width of the top section and a second width of the bottom section. Moreover, the second width is greater than the first width. Additionally, the sealing element extends as a continuous structure along a circumferential axis such that a conical plane of the sealing element is oriented at a third angle to a longitudinal axis of the fitting part.

17 Claims, 11 Drawing Sheets

(51) Int. Cl.
*F16J 15/08* (2006.01)
*F16L 15/04* (2006.01)
*F16L 15/00* (2006.01)
*F16J 13/14* (2006.01)
*F16J 15/06* (2006.01)

(52) U.S. Cl.
CPC ............ *F16J 15/08* (2013.01); *F16J 15/106* (2013.01); *F16L 15/008* (2013.01); *F16L 15/04* (2013.01)

(58) Field of Classification Search
USPC ........................................ 277/644
See application file for complete search history.

(56) References Cited

U.S. PATENT DOCUMENTS

| | | | | |
|---|---|---|---|---|
| 4,034,994 A | * | 7/1977 | Ohta | B29C 57/025 138/109 |
| 4,192,520 A | * | 3/1980 | Hasegawa | F02F 7/006 277/591 |
| 4,193,606 A | | 3/1980 | Iverson | |
| 4,266,752 A | * | 5/1981 | Johnson | F16K 1/2263 251/173 |
| 4,303,251 A | * | 12/1981 | Harra | F16J 15/0881 277/614 |
| 4,544,164 A | * | 10/1985 | Cuijpers | F16J 15/3456 277/402 |
| 4,702,657 A | * | 10/1987 | Jelinek | F16L 43/001 411/369 |
| 4,742,797 A | * | 5/1988 | Barker | G03G 15/0898 118/50 |
| 4,744,572 A | * | 5/1988 | Sahba | F16K 1/2266 251/174 |
| 4,776,599 A | | 10/1988 | Vezirian | |
| 5,934,323 A | * | 8/1999 | Akimoto | F16J 15/025 137/625.69 |
| 6,328,316 B1 | * | 12/2001 | Fukuhara | F16J 15/024 277/626 |
| 7,063,329 B2 | * | 6/2006 | Anderson | F16J 15/062 277/626 |
| 2008/0191474 A1 | * | 8/2008 | Kotz | F16J 15/062 285/276 |
| 2009/0206558 A1 | * | 8/2009 | Nameki | F16J 15/062 277/644 |
| 2012/0223521 A1 | * | 9/2012 | Kotz | F16L 19/0218 285/335 |

* cited by examiner

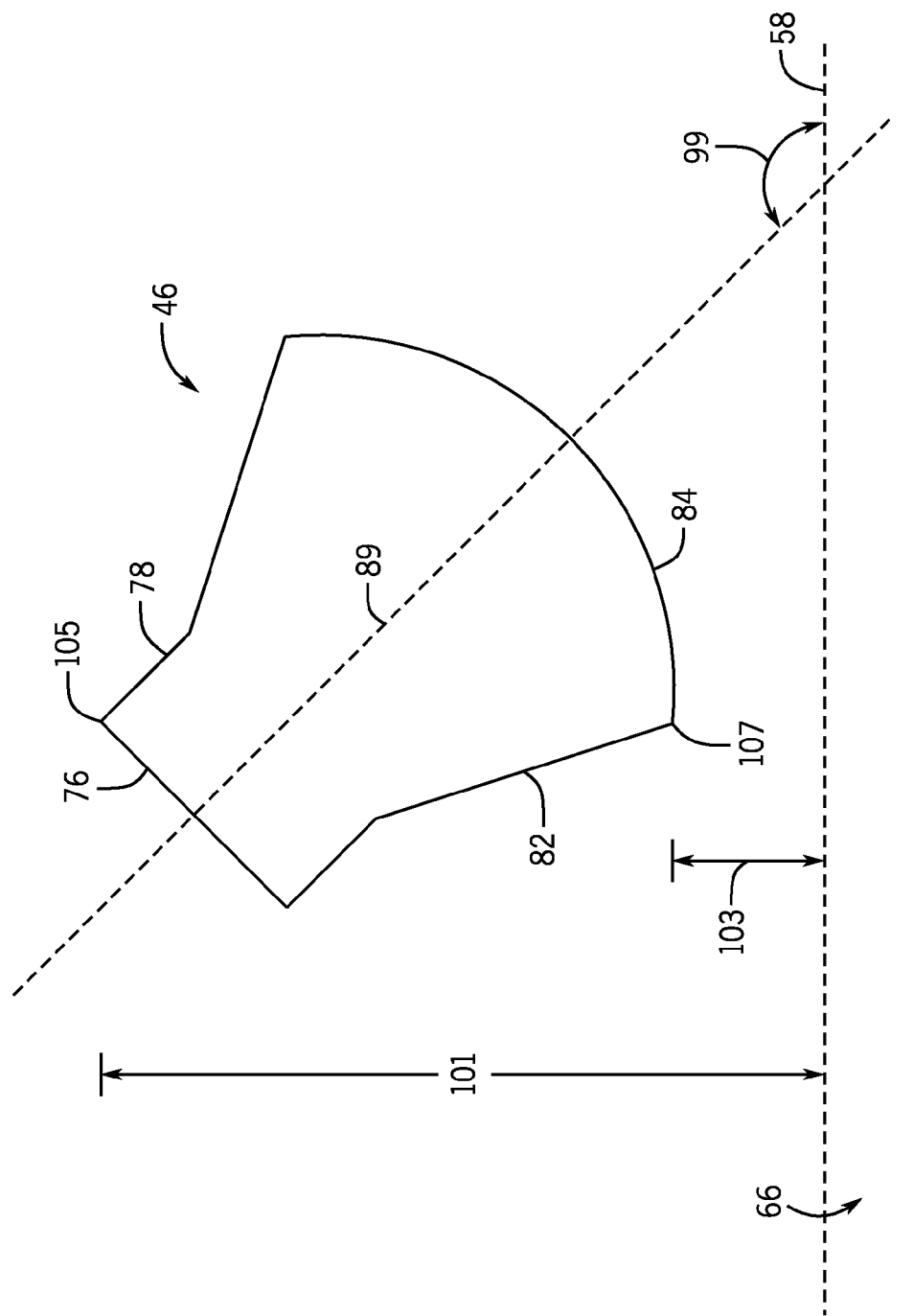

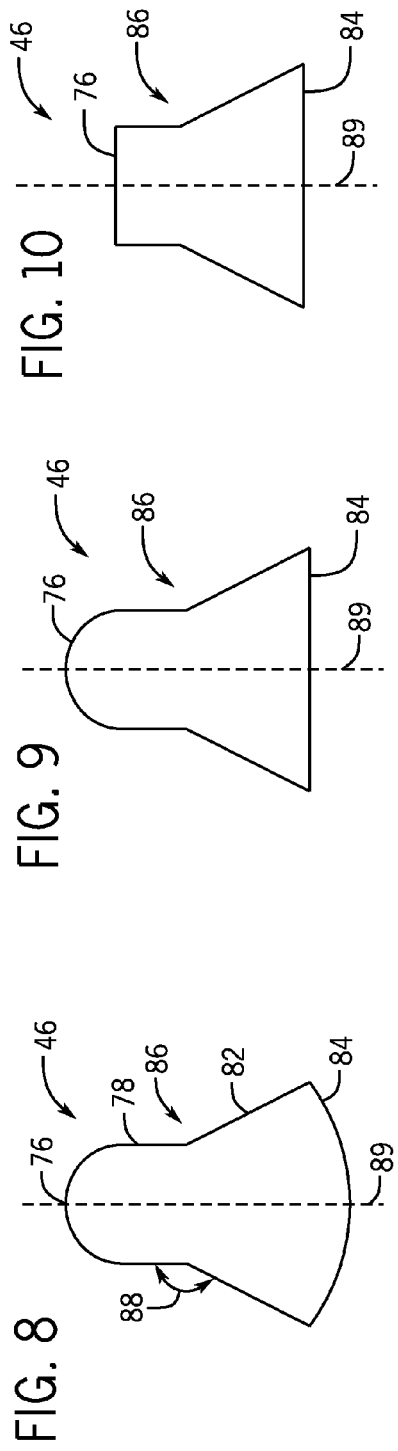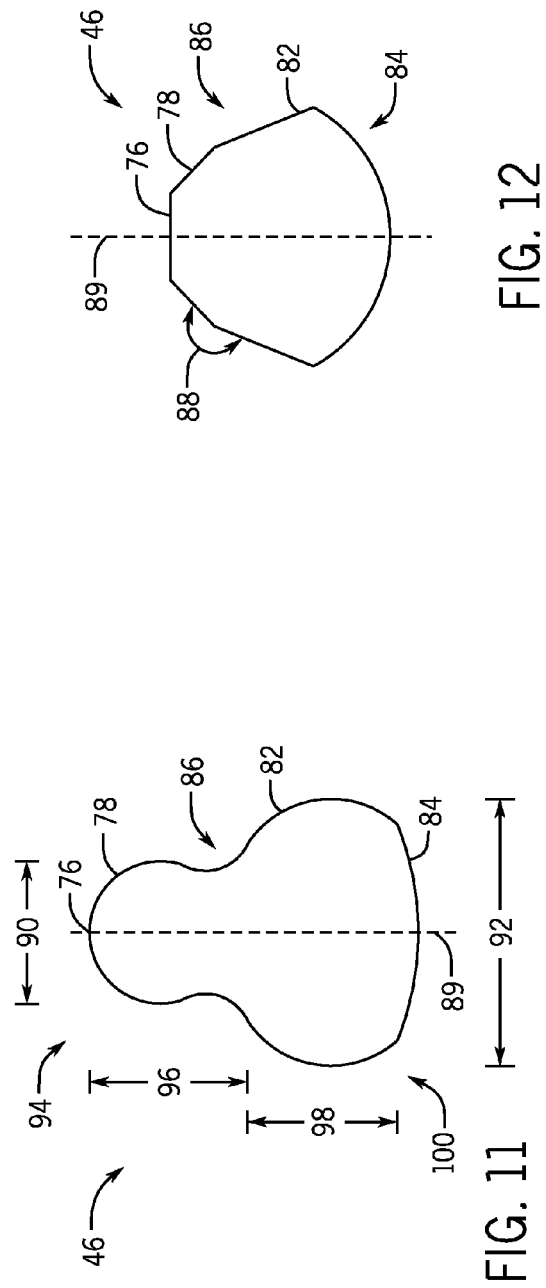

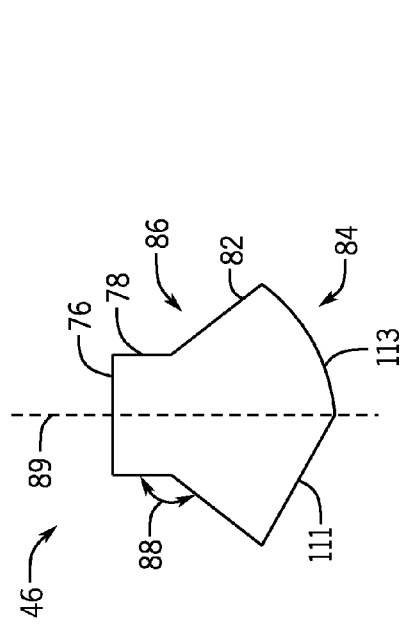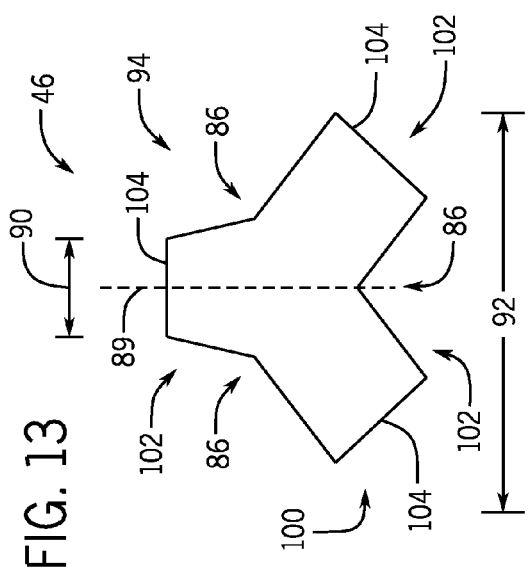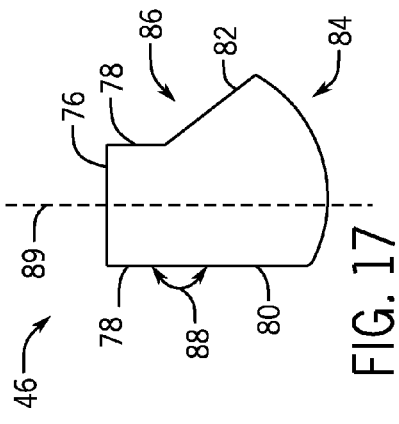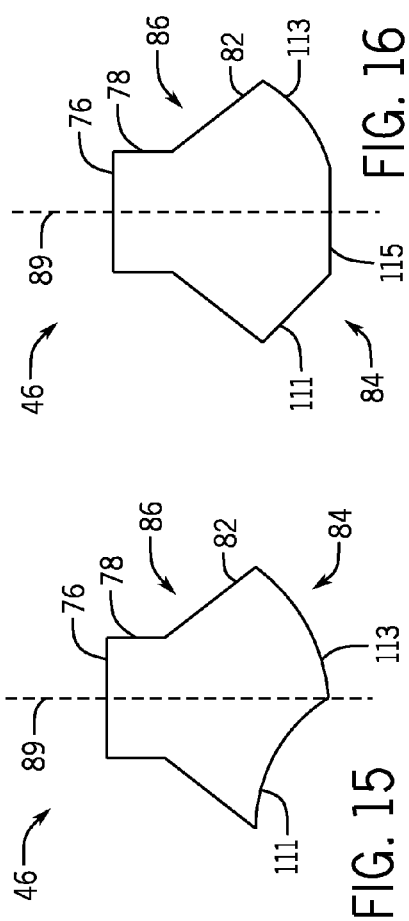

SEALING ELEMENT FOR A HYDRAULIC FITTING

BACKGROUND

The invention relates generally to sealing elements and, more specifically, to a sealing element for a hydraulic fitting.

Typically, sealing elements (e.g., O-rings, seals, gaskets, etc.) are utilized within hydraulic fittings to block fluid flow from the fittings. For example, threaded fittings may include sealing elements around a fluid pathway to block fluid ingress into the threads of the fitting, thereby substantially reducing or eliminating the possibility of fluid leakage from the fitting. The sealing elements may be compressed into grooves of the fitting by an opposing fitting part to create a substantially fluid-tight seal between the fitting and the opposing fitting part. However, in certain fittings, installation of the sealing elements may be difficult and/or time-consuming because of groove configurations and assembly procedures.

BRIEF DESCRIPTION

In an embodiment a sealing element for a fitting part includes a top section. The top section includes a first surface configured to bear against an outer face of an annular groove of the fitting part and a second surface intersecting the first surface at a first angle. In certain embodiments, the second surface is configured to bear against a bottom face of the annular groove of the fitting part. The sealing element also includes a bottom section. The bottom section includes a third surface intersecting the second surface at a second angle. The third surface is configured to bear against the bottom face of the annular groove. The bottom section also includes a fourth surface intersecting the third surface. Furthermore, the sealing element includes an indentation formed at an intersection between the second surface and the third surface. In certain embodiments, the indentation provides a transition between a first width of the top section and a second width of the bottom section. Moreover, the second width is greater than the first width. Additionally, in certain embodiments, the sealing element extends as a continuous structure along a circumferential axis such that a conical plane of the sealing element is oriented at a third angle to a longitudinal axis of the fitting part.

In another embodiment, a sealing system includes a fitting part. The fitting part includes an outer face at an outer radius and an inner face at an inner radius. The inner radius is smaller than the outer radius. The fitting part also includes a bottom face extending between the outer face to the inner face, and a lip disposed proximate to the outer face and extending over the bottom face. In certain embodiments, the outer face, the inner face, the bottom face, and the lip form a groove. The sealing system also includes a sealing element configured to be disposed within the groove and arranged at an installation angle relative to the bottom face. The sealing element includes at least two surfaces coupled together via at least one indentation, a top section having a first width and comprising at least one of the at least two surfaces, and a bottom section having a second width and comprising at least one of the at least two surfaces. In certain embodiments, the second width is greater than the first width. Furthermore, the sealing element extends as a continuous structure along a circumferential axis such that a conical plane of the sealing element is oriented at an angle relative to a longitudinal axis of the fitting part, and the sealing element is substantially symmetrical about the conical plane.

Also, in certain embodiments, the at least one surface of the top section is configured to engage the lip and the at least one indentation is configured to facilitate deformation of the sealing element upon compression.

In an embodiment, a method of installing a sealing element into a fitting part includes placing the sealing element above a groove in the fitting part. The groove is formed by an outer face, an inner face, a bottom face extending between the outer face and the inner face, and a lip extending from the outer face over the bottom face. The method also includes positioning the sealing element at an installation angle within the groove, such that a first surface of the sealing element is arranged proximate to the outer face to establish a space between the first surface and the outer face, a second surface of the sealing element engages the lip, and an indentation formed by a third surface of the sealing element intersecting the second surface is positioned proximate to the bottom face of the groove. The method further includes compressing the sealing element into the groove with a mating part, such that a depth of the indentation is decreased via deformation, and the second surface and the third surface bear against the bottom face.

DRAWINGS

These and other features, aspects, and advantages of the present invention will become better understood when the following detailed description is read with reference to the accompanying drawings in which like characters represent like parts throughout the drawings, wherein:

FIG. 7 is a cross-sectional view of an embodiment of a sealing element that may be disposed within the groove of FIG. 4;

FIG. 8 is a cross-sectional view of another embodiment of a sealing element that may be disposed within the groove of FIG. 4;

FIG. 9 is a cross-sectional view of a further embodiment of a sealing element that may be disposed within the groove of FIG. 4;

FIG. 10 is a cross-sectional view of an embodiment of a sealing element that may be disposed within the groove of FIG. 4;

FIG. 11 is a cross-sectional view of another embodiment of a sealing element that may be disposed within the groove of FIG. 4;

FIG. 12 is a cross-sectional view of a further embodiment of a sealing element that may be disposed within the groove of FIG. 4;

FIG. 13 is a cross-sectional view of a further embodiment of a sealing element that may be disposed within the groove of FIG. 4;

FIG. 14 is a cross-sectional view of an embodiment of a sealing element that may be disposed within the groove of FIG. 4;

FIG. 15 is a cross-sectional view of another embodiment of a sealing element that may be disposed within the groove of FIG. 4;

FIG. 16 is a cross-sectional view of a further embodiment of a sealing element that may be disposed within the groove of FIG. 4

FIG. 17 is a cross-sectional view of another embodiment of a sealing element that may be disposed within the groove of FIG. 4

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Present embodiments disclosed herein relate to a sealing element configured to be disposed within a half-dovetail groove of a fitting. The sealing element includes a top section and a bottom section coupled together at an indentation. The indentation is configured to enable the top section to be inserted within a recess formed by a lip of the half-dovetail groove, thereby facilitating retention of the sealing element within the groove. The sealing element is configured to expand within the groove due to compression of the sealing element by a mating part. As a result, the sealing element substantially fills the groove and creates a substantially liquid-tight seal between the fitting and the mating part.

Figure 1:
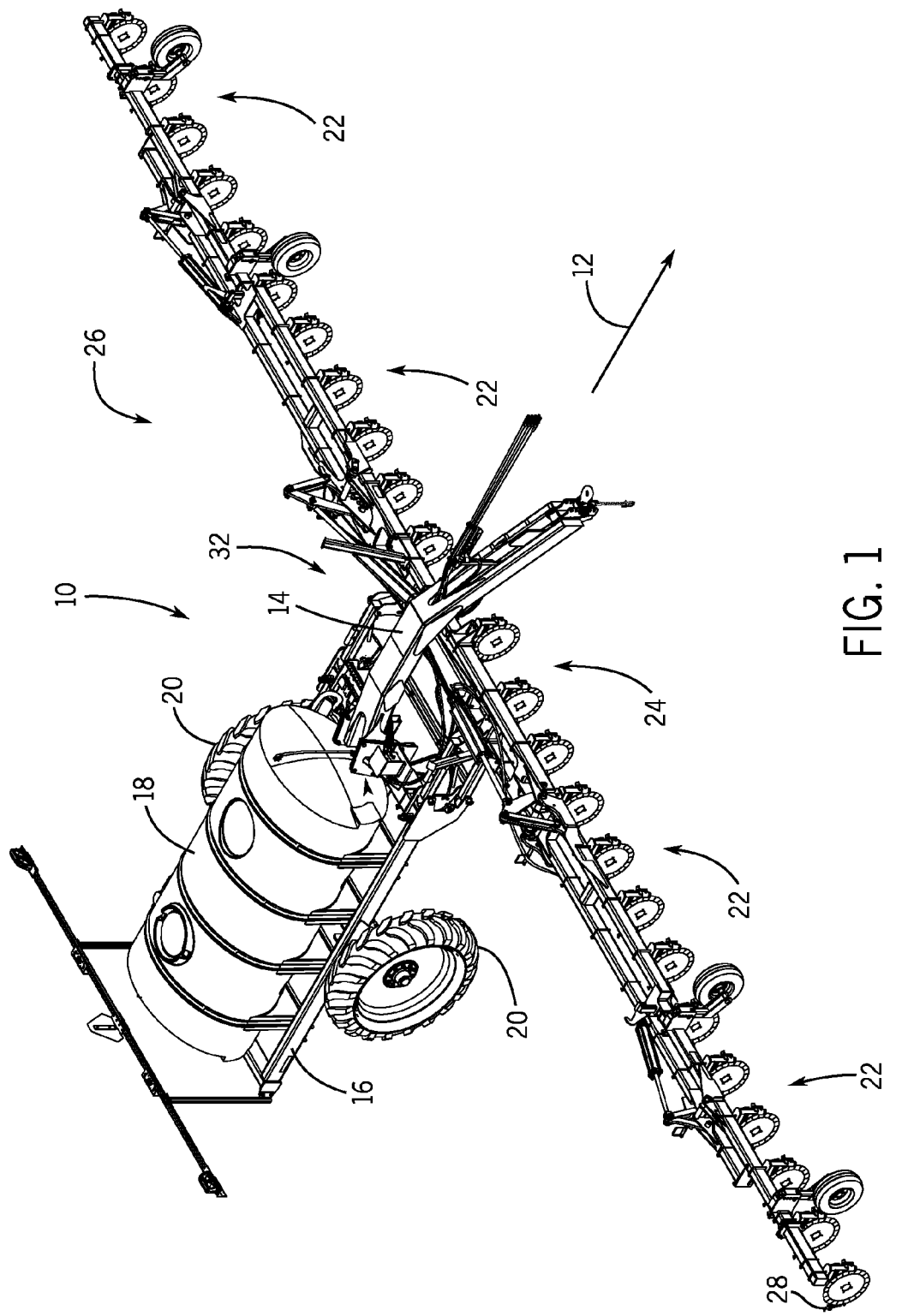
FIG. 1 is a perspective view of an embodiment of an agricultural implement that includes a hydraulic system having fittings and sealing elements.

FIG. 1 is a perspective view of an embodiment of an agricultural implement 10, including a tool bar assembly having multiple wings in a working position. In the illustrated embodiment, the implement 10 is configured to be towed along a direction of travel 12 by a work vehicle, such as a tractor or other prime mover. The work vehicle may be coupled to the implement 10 by a hitch assembly 14, such as the illustrated "goose neck" pull frame. As illustrated, the hitch assembly 14 is coupled to a main frame 16 of the implement 10 to facilitate towing of the implement 10 in the direction of travel 12. In the illustrated embodiment, the main frame 16 supports a storage tank 18 configured to house a flowable agricultural product, such as liquid fertilizer. A pair of wheels 20 coupled to the main frame 16 is configured to support the weight of the frame 16, the storage tank 18, and the flowable agricultural product, thereby enabling the implement 10 to be towed across the field.

The implement 10 is configured to transfer the flowable agricultural product via a pneumatic control system 24 (e.g., conduits, connection fittings, flow meters, etc.) from the storage tank 18 to multiple row units 22 of a tool bar assembly 26 having a central tool bar, a first wing tool bar, a second wing tool bar, a third wing tool bar, and a fourth wing tool bar. Each row unit 22 includes a ground engaging tool 28 configured to break the soil, thereby excavating a trench into the soil. An injection nozzle or knife (e.g., positioned behind the ground engaging tool) is configured to deposit flowable agricultural product from the storage tank 18 into the trench formed by the ground engaging tool 28. In certain embodiments, the penetration depth of the ground engaging tools 28 is adjustable to facilitate deposition of the agricultural product at a desired depth beneath the soil surface. Accordingly, a flowable agricultural product, such as liquid fertilizer, may be distributed throughout a field, either before or after planting, to facilitate enhanced crop development.

While the illustrated implement 10 includes 25 row units 22, it should be appreciated that alternative implements may include more or fewer row units 22. In addition, the number of row units and the spacing between row units may be particularly selected to correspond to the arrangement of row units on respective seeding or planting implements. For example, the implement 10 may include 25 row units 22 spaced 30 inches from one another. Accordingly, as the implement 10 is towed across a field, the row units 22 deposit fertilizer in rows having 30-inch spacing. After the fertilizer is applied, a seeding or planting implement (e.g., having row units spaced 30 inches from one another) may deposit seeds between the rows of fertilizer (e.g., at the approximate midpoint between rows), thereby facilitating enhanced crop development. In addition, the implement 10 may be utilized to apply fertilizer to previously planted seeds (e.g., via injecting fertilizer between rows of the previously planted seeds).

As discussed above, the tool bar assembly 26 includes multiple tool bar sections, such as the central tool bar, inner wing tool bars (e.g., the first wing tool bar and the third wing tool bar), and outer wing tool bars (e.g., the second wing tool bar and the fourth wing tool bar). In the illustrated embodiment, the agricultural implement 10 is in a working position to facilitate distribution of fertilizer throughout a field. The agricultural implement 10 includes a fluid control system 32 (e.g., hydraulic control system) that is covered by a housing, as illustrated. The housing blocks contaminants, such as dust, water, fertilizer, and so forth, from flowing into an interior of the housing, thereby enhancing the longevity of components within the fluid control system 32. As may be appreciated, the fluid control system 32 includes a combination of valves and conduits for directing fluid (e.g., hydraulic fluid) to actuators of the agricultural implement 10 for facilitating folding and/or lifting of the wing tool bar sections. In certain embodiments, the valves and conduits may include threaded fittings having sealing elements disposed between respective components to keep the hydraulic fluid within the fluid control system 32 (e.g., to block leaks).

Figure 2:
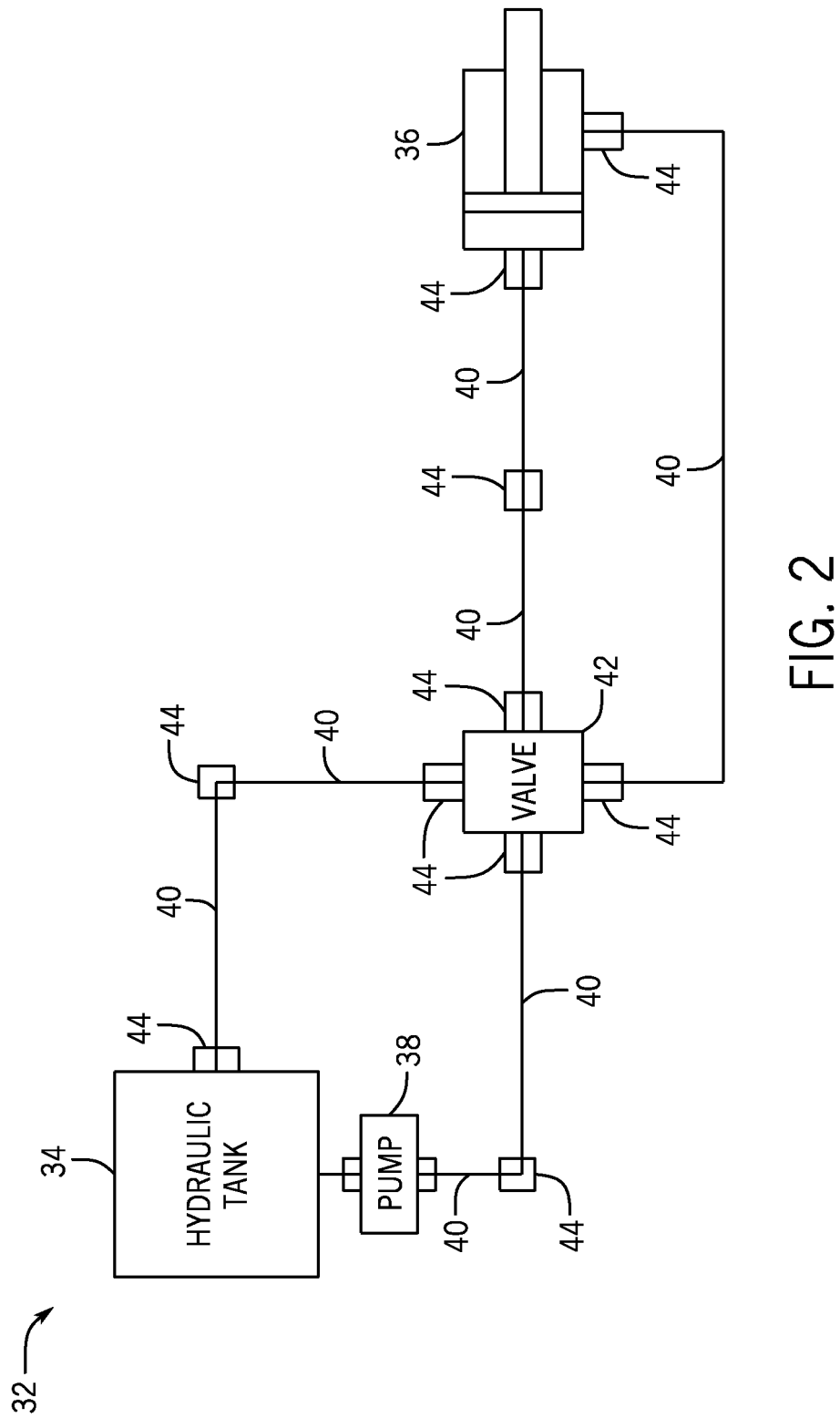
FIG. 2 is a schematic diagram of an embodiment of a hydraulic system that may be used in the agricultural implement of FIG. 1.

FIG. 2 is a schematic diagram of an embodiment of the fluid control system 32. As mentioned above, the fluid control system 32 directs hydraulic fluid to wing tool bar actuators to facilitate folding and/or lifting of the wing tool bars. For example, a tank 34 is configured to store hydraulic fluid for distribution to an actuator 36 via a pump 38. In the illustrated embodiment, the actuator 36 is a hydraulic cylinder configured to drive the folding and/or lifting of the wing tool bar sections. Furthermore, conduits 40 (e.g., pipes, flexible hoses, etc.) direct the hydraulic fluid from the tank 34 to the actuator 36. In certain embodiments, the conduits 40 include threaded sections of generally cylindrical pipe. However, in other embodiments, the conduits 40 may be flexible cylindrical tubing.

In the illustrated embodiment, a three-way valve 42 is configured to direct fluid to the actuator 36 in while the valve is in a first position and to direct hydraulic fluid back toward the hydraulic fluid tank 34 in while the valve is in a second position. While the illustrated embodiment includes the four-way valve 42, in other embodiments different configurations may be used to direct hydraulic fluid to and from the actuator 36. For example, the fluid control system 32 may include two-way valves, control loops, and the like to direct hydraulic fluid to and from the actuator 36.

In certain embodiments, the sections of conduit 40 are coupled together via fittings 44. The fittings 44 are also configured to fluidity couple sections of conduit 40 with the hydraulic tank 34, the pump 38, the four-way valve 42, the actuator 36, and the like. In embodiments in which the conduits 40 include threaded ends, the fittings 44 may include respective mating ends (e.g., internal threads that receive external threads) to couple sections of conduit 40 together. Moreover, the shape of the fittings 44 may be particularly selected to accommodate design conditions. For instance, the fittings 44 may be L-shaped, T-shaped, or the like. As will be discussed in detail below, certain fittings may include a half-dovetail groove to secure a sealing element to the fitting during installation and operation. Moreover, it will be appreciated that while FIG. 2 illustrates a hydraulic fluid system, in other embodiments the pneumatic control system 24 may include similar fittings 44 and conduit 40 to direct the flowable agricultural product to the injection nozzles 30.

Figure 3:
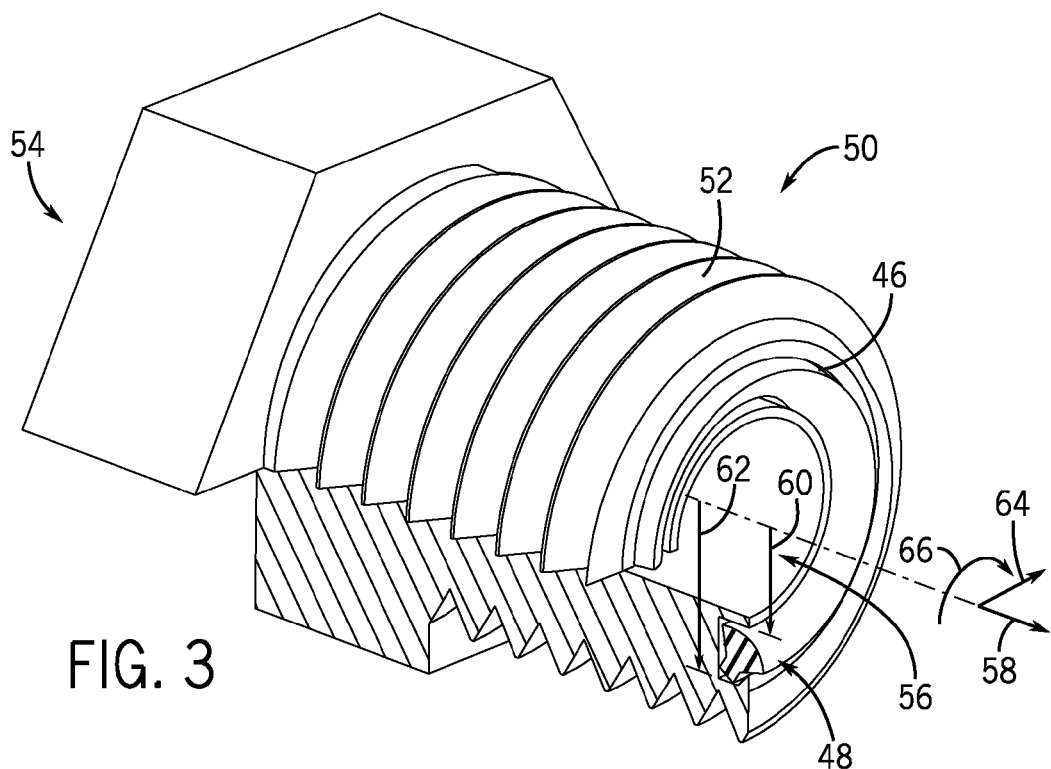
FIG. 3 is a perspective view of an embodiment of a fitting that may be used in the hydraulic system of FIG. 2.

FIG. 3 is a perspective view of an embodiment of the fitting 44 having a sealing element 46 disposed within a groove 48 (e.g., annular groove) of the fitting 44. A quarter-section of the fitting 44 has been removed for clarity. In the illustrated embodiment, the fitting 44 includes a first end 50 having a threaded connection 52 (e.g., external threads) configured to couple the fitting 44 to the hydraulic tank 34, the actuator 36, the pump 38, the conduits 40, the four-way valve 42, and the like. Moreover, a second end 54 includes internal threads and is configured to receive an externally-threaded connection. As shown, the fitting 44 includes a fluid passageway 56 extending along a longitudinal axis 58 of the fitting 44.

As will be described in detail below, the sealing element 46 is disposed within the groove 48. In the illustrated embodiment, the sealing element 46 is formed from nitrile rubber. However, in other embodiments, the sealing element 46 may formed from an elastomer, a polymer, a metal, or the like. In certain embodiments, the sealing element 46 is configured to be compressed by a mating part and to deform within the groove 48. A hardness of the sealing element 46 may be particularly selected to accommodate deformation. In certain embodiments, the hardness of the sealing element 46 may be about 90 Shore A Durometer. However, in other embodiments, the sealing element 46 may be formed from a softer material. One measure of hardness is the resistance to indentation, otherwise referred to as Durometer, denoted in the Shore A scale, for example. Within the Durometer scale, materials are generally characterized based on ranges. Hard or rigid elastomers generally include those having a Durometer greater than about 90 Shore A, soft elastomers generally include those having a Durometer of about 60 Shore A to about 90 Shore A, and super-soft elastomers generally include those having a Durometer below about 60 Shore A.

The groove 48 includes an inner radius 60 and an outer radius 62 separated from one another along a radial axis 64. Moreover, the groove 48 extends about a circumferential axis 66 of the fitting 44. As a result, the groove 48 forms an annular ring around the fluid passage 56. By placing the sealing element 46 within the groove 48, fluid (e.g., hydraulic fluid, air, etc.) leakage from the fluid passage 56 may be substantially reduced or eliminated due to compression of the sealing element 46 within the groove 48 by the mating part (e.g., a mating part of one fitting 44 compresses the sealing element 46 within the groove of a corresponding fitting 44 while the two fittings 44 are coupled together).

Figure 4:
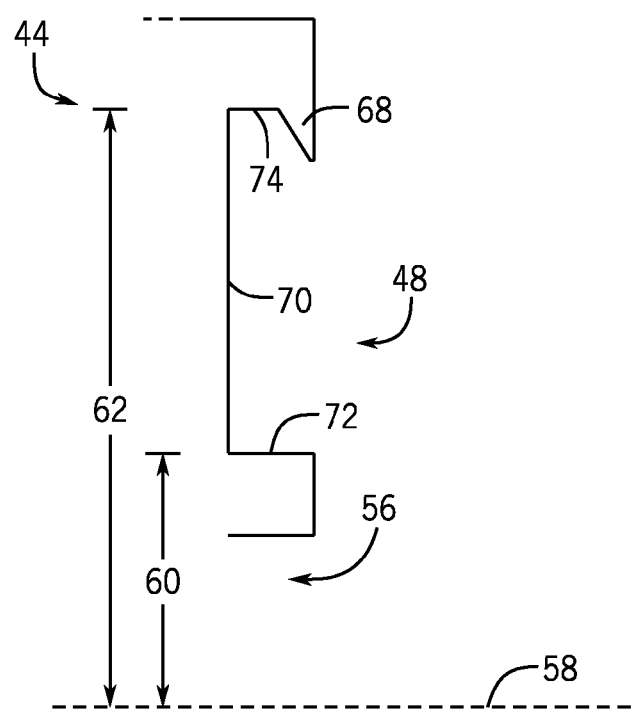
FIG. 4 is a cross-sectional view of a groove within the fitting of FIG. 3.

FIG. 4 is a cross-sectional view of an embodiment of the groove 48. As shown, the fitting 44 includes a lip 68 (e.g., a half dovetail) configured to retain the sealing element 46 within the groove 48. In certain embodiments, the lip 68 may conform to engineering standard SAE J1453-1 or the like. However, in other embodiments, the dimensions of the lip 68 may be particularly selected to retain the sealing element 46 within the groove 48 during installation of the fitting 44 in the mating part and/or operation of the hydraulic system. The fitting 44 includes a bottom face 70 configured to receive the sealing element 46. Moreover, the groove 48 is bound by the bottom face 70, an inner face 72, and an outer face 74. In the illustrated embodiment, the outer face 74 is substantially aligned with the outer radius 62. Furthermore, the inner face 72 is substantially aligned with the inner radius 60. That is, the inner face 72 and the outer face 74 extend circumferentially about the circumferential axis 66 opposite one another in the radial direction. Moreover, the lip 68 is proximate to the outer face 74. However, in other embodiments, the lip 68 may be proximate to the inner face 72. As will be described in detail below, the lip 68 is configured to block movement of the sealing element 46 out of the groove 48.

Figure 5:
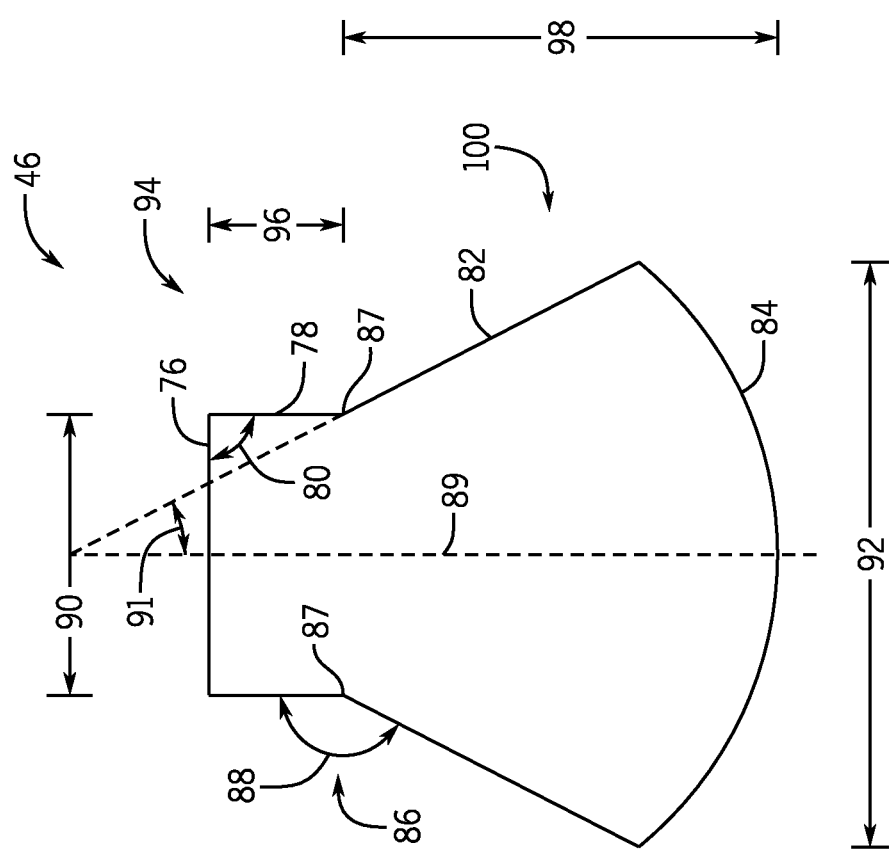
FIG. 5 is a cross-sectional view of an embodiment of a sealing element that may be disposed within the groove of FIG. 4.

FIG. 5 is a cross-sectional view of an embodiment of the sealing element 46 configured to be disposed within the groove 48 of the fitting 44. As shown, the sealing element 46 is generally bell-shaped. That is, the sealing element 46 has a curved (e.g., arcuate) bottom surface with angled sides. A first surface 76 of the sealing element 46 intersects a second surface 78 at a first angle 80. In the illustrated embodiment, the first angle 80 is substantially 90 degrees. However, in certain embodiments, the first angle 80 is between approximately 0 degrees and 180 degrees. For example, the first angle 80 may be 30 degrees, 50 degrees, 70 degrees, 90 degrees, 110 degrees, 130 degrees, 150 degrees, 170 degrees, 180 degrees, or any other suitable dimension. Moreover, in certain embodiments, the first angle 80 is between 50 degrees and 70 degrees, between 70 degrees and 90 degrees, between 90 degrees and 110 degrees, between 110 degrees and 120 degrees, or between 120 degrees and 130 degrees. Furthermore, in other embodiments, the first angle 80 may be less than 120 degrees, less than 140 degrees, or less than 160 degrees. Moreover, while the intersection between the first and second surfaces 76, 78 is shown as a square edge, in other embodiments the connection may be curved or rounded.

In the illustrated embodiment, a third surface 82 extends between the second surface 78 and a fourth surface 84. In the illustrated embodiment, an indentation 86 is formed between the second surface 78 and the third surface 82. The indentation 86 is formed by a second angle 88 between the second surface 78 and the third surface 82. As shown, the indentation 86 includes a point 87. However, in other embodiments, the indentation 86 may be curved (e.g., the point 87 may be a rounded surface). Moreover, in other embodiments, the indentation 86 may be convex. That is, that indentation 86 may extend radially away from a conical plane 89 (i.e., a plane that extends circumferentially through the center of the sealing element 46). In certain embodiments, the second angle 88 is between 90 degrees and 270 degrees. For example, the second angle 88 may be 90 degrees, 110 degrees, 130 degrees, 150 degrees, 170 degrees, 180 degrees, 210 degrees, 230 degrees, 250 degrees or any other suitable dimension. Moreover, in certain embodiments, the second angle 88 is between 140 degrees and 150 degrees, between 150 degrees and 160 degrees, between 160 degrees and 170 degrees, between 170 and 180 degrees, between 180 degrees and 210 degrees, between 210 degrees and 230 degrees, between 230 degrees and 250 degrees, or between 250 degrees and 270 degrees. Furthermore, in other embodiments, the second angle 88 may be greater than 120 degrees, greater than 140 degrees, greater than 160 degrees, greater than 180 degrees, greater than 200 degrees, greater than 220 degrees, greater than 240 degrees, or greater than 260 degrees. For example, in the illustrated, the second angle 88 is approximately 170 degrees. The second angle 88 may be particularly selected based on the material properties of the sealing element 46. For example, the second angle 88 may be selected to reduce the possibility of cracking of the sealing element 46, to facilitate compression of the sealing element 46, and/or to substantially fill the groove 48. As used herein, the term substantially fill is intended to describe occupying a portion of the volume of the groove 48 and not necessarily the entire volume of the groove 48. For example, the sealing element 46 may substantially fill the groove 48 by occupying a larger volume of the groove 48 when compressed within the groove 48.

Furthermore, the third surface 82 of the sealing element 46 is arranged at third angle 91, relative to the conical plane 89. In certain embodiments, the third angle 91 is between 0 and 90 degrees. For example, the third angle 91 may be 10 degrees, 20 degrees, 30 degrees, 40 degree, 50 degrees, or any other suitable dimension. Moreover, in certain embodiments, the third angle is between 10 and 30 degrees, between 30 and 50 degrees, or between 50 and 70 degrees. Furthermore, in other embodiments, the third angle 91 may be less than 90 degrees, less than 80 degrees, less than 70 degrees, less than 60 degrees, or less than 50 degrees. The third angle 91 may be particularly selected based on the material properties of the sealing element 46. For example, the third angle 91 may be selected to reduce the possibility of cracking of the sealing element 46, to facilitate compression of the sealing element 46, and/or to substantially fill the groove 48.

As shown in FIG. 5, the fourth surface 84 is generally curved. Moreover, the curved fourth surface 84 is convex relative to the first surface 76. However, in other embodiments, the fourth surface 84 may be concave relative to the first surface 76. Moreover, in certain embodiments, the fourth surface 84 may be flat, wavey, pointed, or any other appropriate shape. Additionally, the other surfaces (e.g., the first surface 76, the second surface 78, and the third surface 82) may be flat, wavey, or curved. Furthermore, in the illustrated embodiment, the sealing element 46 is substantially symmetrical about the conical plane 89. In other words, in certain embodiments, the sealing element 46 is substantially mirrored about the conical plane 89. In certain embodiments, the conical plane 89 is substantially flat. However, in certain embodiments, the sealing element 46 may not be symmetrical. For example, half of the fourth surface 84 may be curved while the other half is angled.

In the illustrated embodiment, a first width 90 of a top section 94 of the sealing element 46 is less than a second width 92 of a bottom section 100. In other words, the radial extent of the fourth surface 84 is greater than the radial extent of the first surface 76. As will be described below, the first width 90 may be particularly selected to conform to the shape and/or size of the groove 48. Moreover, a top height 96 of the top section 94 is less than a bottom height 98 of the bottom section 100. As used herein, height refers to an extent along the conical plane 89. The top section 94 includes the first surface 76 and the second surface 78. The bottom section 100 includes the third surface 82 and the fourth surface 84. In other embodiments, the top height 96 may be greater than the bottom height 98, or the top and bottom heights 96, 98 may be substantially equal. It will be appreciated that the dimensions of the sealing element (e.g., top height 96, first width 90, etc.) may be particularly selected based on the shape and/or size of the groove 48.

Figure 6:
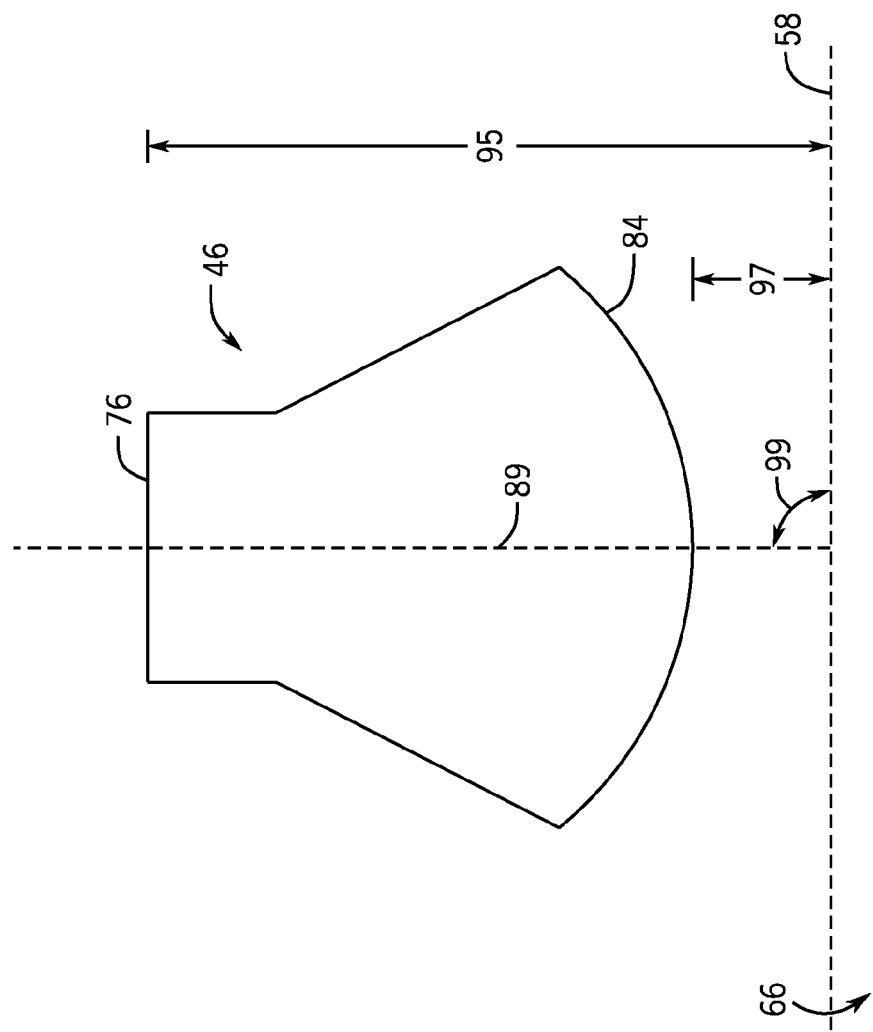
FIG. 6 is a cross-sectional view of the sealing element of FIG. 5.

FIG. 6 is a cross-sectional view of an embodiment of the sealing element 46. In the illustrated embodiment, the conical plane 89 is substantially perpendicular to the longitudinal axis 58. That is, an angle 99 is equal to approximately 90 degrees. As described above, the sealing element 46 is generally annular. Accordingly, the sealing element 46 is revolved along the circumferential axis 66, forming an annular ring having a first outer seal radius 95 and a first inner seal radius 97. As shown, the first outer seal radius 95 substantially aligns with the first surface 76 and the first inner seal radius 97 substantially aligns with the fourth surface 84. As will be described below, the sealing element 46 may be deformed while installing the sealing element 46 within the groove 48.

FIG. 7 is a cross-sectional view of a further embodiment of the sealing element 46. In the illustrated embodiment, the conical plane 89 of the sealing element 46 is oriented at the angle 99 relative to the longitudinal axis 58. For example, the angle 99 may be particularly selected based on the dimensions of the groove 48. In certain embodiments, the angle 99 is between 90 and 180 degrees. For example, the angle 99 may be 90 degrees, 100 degrees, 110 degrees, 120 degrees, 130 degrees, 140 degrees, 150 degrees, 160 degrees, 170 degrees, 180 degrees, or any other angle dimension. Moreover, in certain embodiments, the angle 99 is between 140 degrees and 150 degrees, between 150 degrees and 160 degrees, between 160 degrees and 170 degrees, or between 170 degrees and 180 degrees. Furthermore, in other embodiments, the angle 99 may be greater than 120 degrees, greater than 140 degrees, or greater than 160 degrees. As described above, the sealing element 46 may be annular or elliptical (e.g., about the longitudinal axis 58). In the illustrated embodiment, the sealing element 46 is revolved along the circumferential axis 66 to form an annular sealing element 46 having a second outer seal radius 101 and a second inner seal radius 103. As shown, the second outer seal radius 101 is substantially aligned with a point 105 at which the first surface 76 intersects the second surface 78. Furthermore, the second inner seal radius 101 is substantially aligned with a point 107 at which the third surface 82 intersects the fourth surface 84.

FIGS. 8-17 illustrate cross-sectional views of alternative embodiments of the sealing element 46. In FIG. 8, the sealing element 46 includes a curved first surface 76. As shown, the first surface 76 is convex, relative to the fourth surface 84. The fourth surface 84 is also convex, in the illustrated embodiment. Turning to FIG. 9, the sealing element 46 includes a convex first surface 76 and a generally flat fourth surface 84. In FIG. 10, the sealing element 46 includes a generally flat first surface 76 and a generally flat fourth surface 84. However, it will be appreciated that, in other embodiments, the second surface 78 and/or the third surface 82 of the sealing elements 46 may be generally curved or rounded.

FIG. 11 is a cross-sectional view of a further embodiment of the sealing element 46. As shown, the first surface 76 is convex relative to the fourth surface 84 and generally curved. Moreover, the second surface 78 extends from the first surface 76 and is also curved. In the illustrated embodiment, the indentation 86 between the second surface 78 and the third surface 82 is also curved and generally concave. Furthermore, the third surface 82 and the fourth surface 84 are convex. Accordingly, the sealing element 46 is generally peanut shaped. In the illustrated embodiment, the second width 92 is greater than the first width 90. However, in other embodiments, the first width 90 may be greater than or the same as the second width 92. Furthermore, as illustrated in FIG. 11, the top height 96 of the top section 94 is less than the bottom height 98 of the bottom section 100. In certain embodiments, the top height 96 is greater than or equal to the bottom height 98.

Turning to FIG. 12, a cross-sectional view of a further embodiment of the sealing element 46 is shown. In the illustrated embodiment, the second angle 88 is greater than 180 degrees. As a result, the indentation 86 is convex relative to the conical plane 89. FIG. 13 is a cross-sectional view of a further embodiment of the sealing element 46. As shown, the sealing element 46 is generally shaped as a cropped three-point star. That is, the sealing element 46 includes three legs 102 joined at the indentations 86. Each leg 102 includes surfaces 104 that are generally flat. Furthermore, in the illustrated embodiment, the top section 94 includes one leg 102 in which the first width 90 of the first leg is less than the second width 92 of the bottom section 100. However, in other embodiments, the surfaces 104 may be curved (e.g., convex or concave), pointed, or any other suitable shape.

FIG. 14 is a cross-sectional view of a further embodiment of the sealing element 46. In the illustrated embodiment, the fourth surface 84 includes two surfaces having substantially different shapes. A fifth surface 111 and a sixth surface 113 converge and form the fourth surface 84. As shown, the fifth surface 111 intersects the third surface 82 at an angle. Moreover, the sixth surface 113 intersects the third surface 113 at an angle and is convex relative to the first surface 76. Accordingly, the sealing element 46 is not symmetrical about the conical plane 89. Turning to FIG. 15, a cross-sectional view of an embodiment of the sealing element 46 is shown. The fifth surface 111 and the sixth surface 113 form the fourth surface 84. In the illustrated embodiment, the fifth surface 111 is concave relative to the first surface 76, while the sixth surface 113 is convex relative to the first surface 76. As a result, the sealing element 46 is not symmetrical about the conical plane 89. In FIG. 16, the fourth surface 84 includes three surfaces. The fifth surface 111 intersects the third surface 82 and the sixth surface 113 intersects the third surface 82. Additionally, a seventh surface 115 intersects the fifth and sixth surfaces 111, 113 to form the fourth surface 84. In the illustrated embodiments, the fifth surface 111 is angled relative to the first surface 76 and the sixth surface 113 is concave relative to the first surface 76. Moreover, the seventh surface 115 is generally flat. As a result, the sealing element 46 may include multiple surfaces have different shapes to conform to the groove 48. In further embodiments, the first, second, third, or fourth surfaces 76, 78, 82, 84 may include any number of additional surfaces. For example, the first surface 84 may include two surfaces forming a point. Furthermore, in other embodiments, the fourth surface 84 may include 1, 2, 3, 4, 5, 6, 7, or any suitable number of surfaces.

FIG. 17 is a cross-sectional view of an embodiment of the sealing element 46. In the illustrated embodiment, the second angle 88 is approximately 180 degrees. As a result, the second surface 78 and the third surface 82 are substantially flat (e.g., substantially parallel to the conical plane 89) along one side of the sealing element 46. As shown, the fourth surface 84 intersects the third surface 82. As described above, in certain embodiments, the first, second, third, or fourth surfaces 76, 78, 82, 84 may include multiple surfaces. In the illustrated embodiment, the fourth surface 84 is convex relative to the first surface 76. Moreover, the sealing element 46 is not symmetrical about the conical plane 89.

Figure 18:
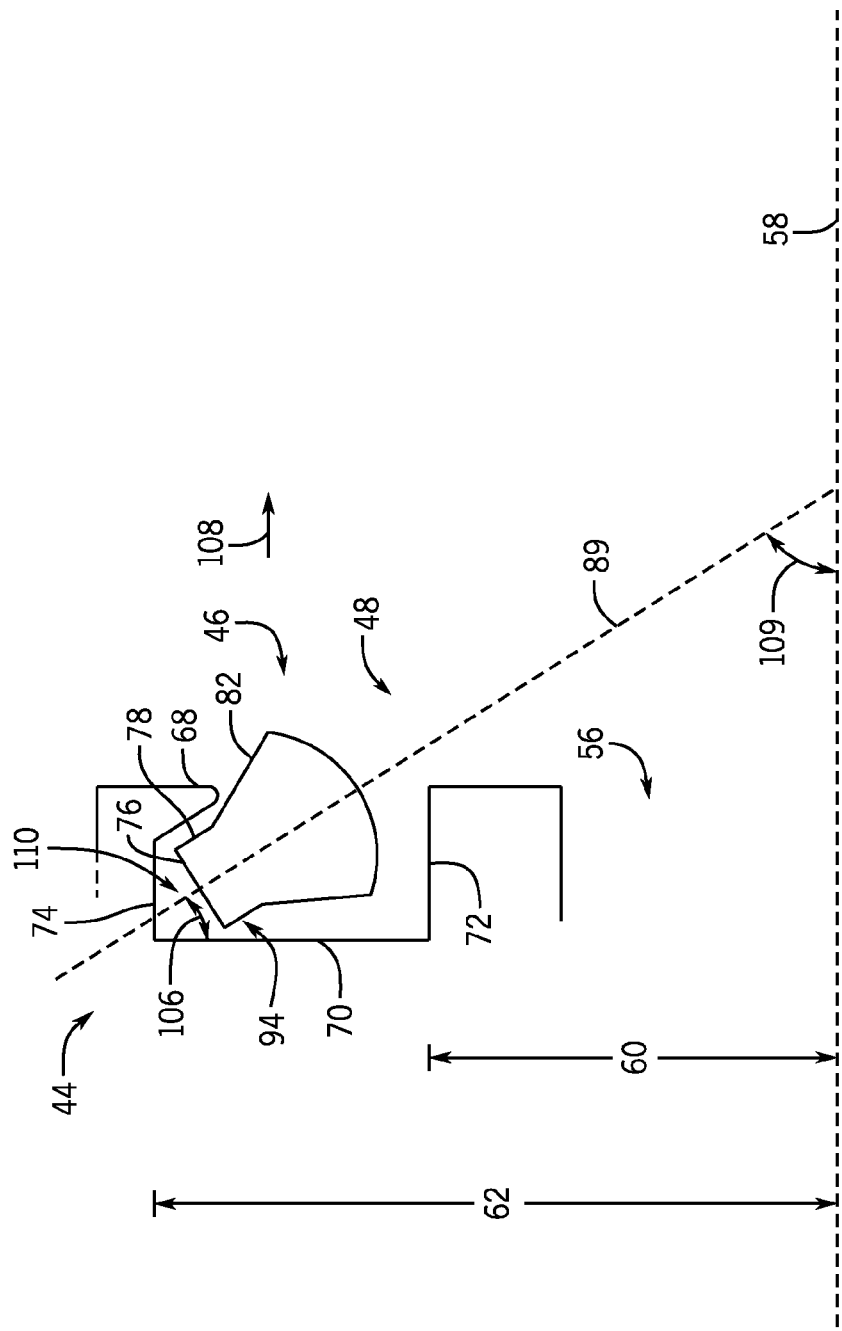
FIG. 18 is a cross-sectional view of an embodiment of a sealing element disposed within the groove of FIG. 4.

FIG. 18 is a cross-sectional view of an embodiment of the sealing element 46 disposed within the groove 48. In the illustrated embodiment, the first surface 76 of the sealing element 46 is proximate to the outer face 74 of the groove 46. Moreover, the lip 68 substantially aligns with the second surface 78 due to an installation angle 106 between the conical plane 89 of the sealing element 46 and the bottom face 70. While inserted into the groove 48, the second surface 78 and a portion of the third surface 82 are positioned between the lip 68 and the bottom face 70. Accordingly, the sealing element 46 resists a force applied in a first direction 108 via contact between the sealing element 46 and the lip 68. In other words, the lip 68 is configured to hold the sealing element 46 in the groove 48. In certain embodiments, the sealing element 46 may be deformed while being placed within the groove 48 (e.g., for sealing elements 46 having the configuration of FIG. 6).

In the illustrated embodiment, a space 110 is formed between the first surface 76 and the outer face 74 while the sealing element 46 is in the installation position. The space 110 enables expansion and/or deformation of the sealing element 46 due to a compressive force applied by the mating part. For example, as will be described below, a compression surface of the mating part compresses the sealing element 46 against the bottom face 70 of the fitting 44. Because the space 110 enables deformation of the sealing element 46, pressure and/or pinching due to the compression of the sealing element 46 may be reduced or eliminated. Moreover, as shown in FIG. 18, a portion of the third surface 82 and the fourth surface 84 extend out of the groove 48. In certain embodiments, the portion that extends out of the groove 48 may serve as an indication to the operator that the sealing element 46 is installed in the proper orientation. For example, in embodiments in which the fourth surface 84 is curved, the presence of the curved fourth surface adjacent to the lip 68 may indicate the sealing element 46 is installed in the proper orientation.

In the illustrated embodiment, the sealing element 46 is configured to be placed within the groove 48 at an angle 109 relative to the longitudinal axis 58. Moreover, as described above, the sealing element 46 is revolved about the longitudinal axis 58 to conform to the groove 48. While the sealing element 46 may be generally annular in the illustrated embodiment, in other embodiments the sealing element 46 may be elliptical or the like. As described above, in certain embodiments, the sealing element 46 may be deformed during installation into the groove 48. For example, the top section 94 may be installed within the groove 48 by depressing the sealing element 46 to position the sealing element 46 at the angle 109. In certain embodiments, the angle 109 is substantially equal to the installation angle 106.

Figure 19:
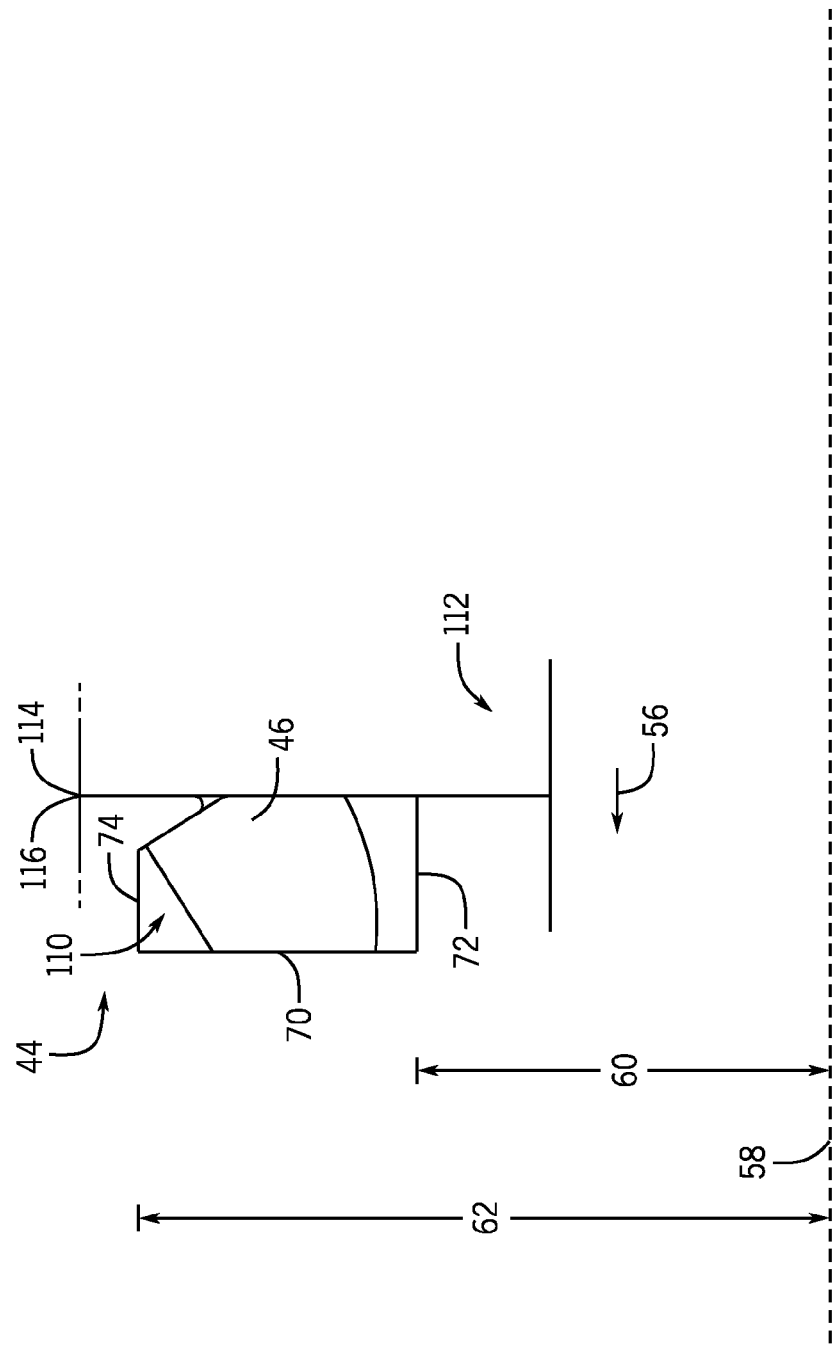
FIG. 19 is a cross-sectional view of the sealing element of FIG. 11 compressed within the groove via a mating part.

FIG. 19 is a cross-sectional view of an embodiment of a mating part 112 coupled to the fitting 44. In certain embodiments, the mating part 112 is a fitting having internal threads configured to receive the external threads of the fitting 44. As shown, the mating part 112 has a generally flat compression surface 114 configured to contact a sealing surface 116 of the fitting 44. By contacting the sealing surface 116, the compression surface 114 bears against the sealing element 46 and compresses the sealing element 46 within the groove 48. As a result, the sealing element 46 deforms and expands within the groove 48 to substantially fill the groove 48. As shown, the sealing element 46 expands into the space 110 due to the force applied by the compression surface 114. In certain embodiments, the sealing element 46 bears against the outer face 74 while the mating part 112 is coupled to the fitting 44. Moreover, in other embodiments, the sealing element 46 may bear against the bottom face 70 and/or the inner face 72 while the mating part 112 is coupled to the fitting 44. As mentioned above, the size and/or shape of the sealing element 46 may be particularly selected based on the size and/or shape of the groove 48 to establish a substantially liquid-tight seal between the fluid passageway 56 and the groove 48.

Figure 20:
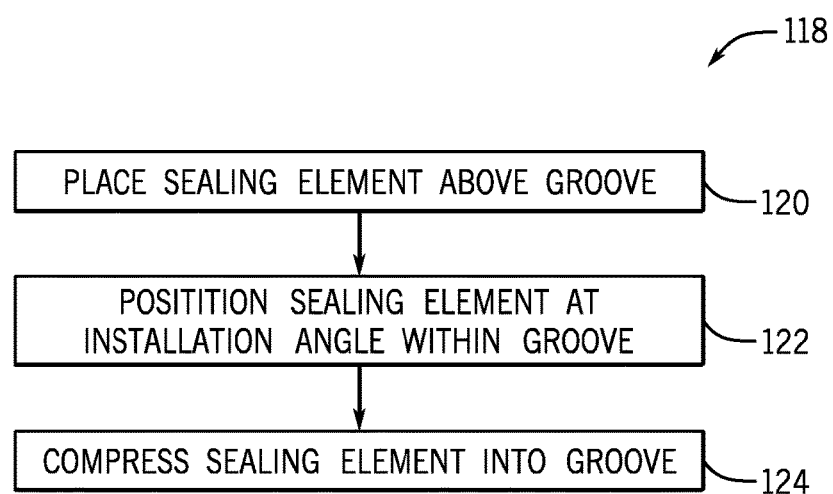
FIG. 20 is a flowchart of an embodiment of a method for installing a sealing element within a groove.

FIG. 20 is an embodiment of a flowchart of a method 118 of installing the sealing element 46 into the groove 48. The sealing element 46 is placed above the groove 48 at block 120. Moreover, the sealing element 46 is positioned at the installation angle 106 within the groove 48 at block 122. For example, in certain embodiments, the sealing element 46 may be pressed into the groove 48, thereby deforming the sealing element 46. The first surface 76 of the sealing element 46 may be arranged proximate to the outer face 74. For example, the arrangement of the first surface 76 within the groove 48 may establish the space 110 between the first surface 76 and the outer face 74. While in the groove 48, the second surface 78 of the sealing element 46 may engage the lip 68. In certain embodiments, the lip 68 may hold the sealing element 46 within the groove 48. Moreover, the indentation 86 may be positioned proximate to the bottom face 70 of the groove. The sealing element 46 is compressed into the groove 48 with the mating part 112 at block 124. The compression may drive the second surface 78 to bear against the bottom face 70. Moreover, the third surface 82 may bear against the bottom face 70 while the sealing element 46 is compressed within the groove 48. Furthermore, the indentation 86 may enable compression and/or deflection of the sealing element 46. For example, the second angle 88 may increase (e.g., the depth of the indentation 86 may decrease) while the sealing element 46 is compressed within the groove 48. In certain embodiments, the sealing element 46 may expand to substantially fill the groove 48.

As described in detail above, the sealing element 46 enables a substantially liquid-tight seal between the fluid passageway 56 and the groove 48. For example, the indentation 86 formed by the second surface 78 and the third surface 82 enables the sealing element 46 to be installed in the groove 48 without bearing against the outer face 74 and creating a stress point. Furthermore, by installing the top section 94 under the lip 68, the sealing element 46 may remain in the groove 48 during the installation process because of the compression of the sealing element 46 between the lip 68 and the bottom face 70. Moreover, the shape of the sealing element 46 enables deformation, which facilitates expansion of the sealing element 46 within the groove 48. For example, the space 110 is configured to receive a deformed portion of the sealing element 46 after the mating part 112 compresses the sealing element 46 within the groove 48. As a result, the sealing element 46 is configured to substantially fill the groove 48, thereby establishing a substantially liquid-tight seal.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A sealing element for a fitting part, comprising: a top section, comprising:
   a first surface configured to bear against an outer face of an annular groove of the fitting part; and
   a second surface intersecting the first surface at a first angle, wherein the second surface is configured to bear against a bottom face of the annular groove of the fitting part;
   a bottom section, comprising:
   a third surface intersecting the second surface at a second angle, wherein the third surface is configured to bear against the bottom face of the annular groove; and
   a fourth surface intersecting the third surface; and an indentation formed at an intersection between the second surface and the third surface, wherein the indentation provides a transition between a first width of the top section and a second width of the bottom section, wherein the second width is greater than the first width;
   wherein the sealing element extends as a continuous structure along a circumferential axis such that a conical plane of the sealing element is oriented at a third angle to a longitudinal axis of the fitting part, wherein the sealing element is configured to substantially fill the annular groove while the sealing element is compressed into the annular groove by a mating part, and wherein the third surface of the sealing element contacts the mating part while the mating part compresses the sealing element into the annular groove.

2. The sealing element of claim 1, wherein the third angle is substantially 90 degrees and the conical plane is substantially flat.

3. The sealing element of claim 1, wherein the sealing element is substantially symmetrical about the conical plane.

4. The sealing element of claim 1, wherein the second angle is between 90 degrees and 270 degrees.

5. The sealing element of claim 1, wherein the fourth surface is curved and has a generally convex shape relative to the first surface.

6. The sealing element of claim 1, wherein the fourth surface comprises a fifth surface intersecting the third surface at a fourth angle, and a sixth surface intersecting the third surface at a fifth angle.

7. The sealing element of claim 1, wherein a top height of the top section is less than a bottom height of the bottom section.

8. The sealing element of claim 1, wherein the third angle is between 0 and 90 degrees.

9. The sealing element of claim 1, wherein the third angle is substantially 90 degrees and the conical plane is substantially flat.

10. The sealing element of claim 1, wherein the sealing element is substantially symmetrical about the conical plane.

11. The sealing element of claim 1, wherein the second angle is between 90 degrees and 270 degrees.

12. The sealing element of claim 1, wherein the fourth surface is curved and has a generally convex shape relative to the first surface.

13. The sealing element of claim 1, wherein the sealing element is configured to substantially fill the groove while the sealing element is compressed into the annular groove by a mating part.

14. The sealing element of claim 13, wherein the third surface of the sealing element contacts the mating part while the mating part compresses the sealing element into the annular groove.

15. The sealing element of claim 1, wherein a top height of the top section is less than a bottom height of the bottom section.

16. The sealing element of claim 1, wherein the third angle is between 0 and 90 degrees.

17. A sealing element for a fitting part, comprising:
a top section, comprising:
　a first surface configured to bear against an outer face of an annular groove of the fitting part; and
　a second surface intersecting the first surface at a first angle, wherein the second surface is configured to bear against a bottom face of the annular groove of the fitting part;
a bottom section, comprising:
　a third surface intersecting the second surface at a second angle, wherein the third surface is configured to bear against the bottom face of the annular groove; and
　a fourth surface intersecting the third surface; and
an indentation formed at an intersection between the second surface and the third surface, wherein the indentation provides a transition between a first width of the top section and a second width of the bottom section, wherein the second width is greater than the first width;
wherein the sealing element extends as a continuous structure along a circumferential axis such that a conical plane of the sealing element is oriented at a third angle to a longitudinal axis of the fitting part,
wherein the fourth surface comprises a fifth surface intersecting the third surface at a fourth angle, and a sixth surface intersecting the third surface at a fifth angle.

* * * * *